United States Patent
Wang et al.

(10) Patent No.: US 10,051,459 B2
(45) Date of Patent: Aug. 14, 2018

(54) COMMUNICATION METHOD, USER EQUIPMENT, AND NETWORK DEVICE

(71) Applicant: Huawei Device (Dongguan) Co., Ltd., Dongguan (CN)

(72) Inventors: Jian Wang, Beijing (CN); Kai Xu, Beijing (CN); Ke Wang, Shenzhen (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 122 days.

(21) Appl. No.: 14/973,067

(22) Filed: Dec. 17, 2015

(65) Prior Publication Data

US 2016/0105791 A1    Apr. 14, 2016

Related U.S. Application Data

(63) Continuation of application No. PCT/CN2013/080224, filed on Jul. 26, 2013.

(51) Int. Cl.
| | |
|---|---|
| *H04W 8/14* | (2009.01) |
| *H04W 8/00* | (2009.01) |
| *H04W 68/02* | (2009.01) |
| *H04W 72/04* | (2009.01) |

(52) U.S. Cl.
CPC ............ *H04W 8/14* (2013.01); *H04W 8/005* (2013.01); *H04W 68/02* (2013.01); *H04W 72/0466* (2013.01)

(58) Field of Classification Search
None
See application file for complete search history.

(56) References Cited

U.S. PATENT DOCUMENTS

| | | | |
|---|---|---|---|
| 9,392,433 B2 * | 7/2016 | Li | H04W 8/005 |
| 9,414,306 B2 * | 8/2016 | Han | H04W 36/0066 |
| 2011/0098043 A1 | 4/2011 | Yu et al. | |

(Continued)

FOREIGN PATENT DOCUMENTS

| | | |
|---|---|---|
| CN | 1863395 A | 11/2006 |
| CN | 102480786 A | 5/2012 |

(Continued)

OTHER PUBLICATIONS

3rd Generation Partnership Project; Technical Specification Group Radio Access Network; Evolved Universal Terrestrial Radio Access (E-UTRA); Physical Channels and Modulation (Release 11), 3GPP TS 36.211, Jun. 2013, pp. 1-108, V11.3.0, France.

(Continued)

*Primary Examiner* — Saba Tsegaye
(74) *Attorney, Agent, or Firm* — Slater Matsil, LLP

(57) ABSTRACT

Embodiments relate to a communication method, user equipment, and a network device. A discovery message sent by second user equipment indicates cell information of the user equipment, so that first user equipment that receives the discovery message sends a communication request to a network device according to the discovery message. The communication request indicates the cell information of the second user equipment. The network device sends a paging message to the second user equipment according to a cell message of the second user equipment, which saves resources in a paging process of direct communication.

16 Claims, 10 Drawing Sheets

(56) References Cited

U.S. PATENT DOCUMENTS

| | | |
|---|---|---|
| 2012/0057646 A1 | 3/2012 | Jovicic et al. |
| 2013/0130727 A1 | 5/2013 | Hakola et al. |
| 2013/0188546 A1 | 7/2013 | Turtinen et al. |
| 2015/0382389 A1* | 12/2015 | Seo ................. H04W 8/005 370/280 |
| 2016/0014825 A1* | 1/2016 | Kim ................. H04W 8/005 370/329 |
| 2016/0142898 A1* | 5/2016 | Poitau ............. H04W 72/0413 370/329 |
| 2016/0157287 A1* | 6/2016 | Chae ................ H04L 5/0023 370/329 |

FOREIGN PATENT DOCUMENTS

| | | |
|---|---|---|
| CN | 102857901 A | 1/2013 |
| WO | 2013108219 A1 | 7/2013 |

OTHER PUBLICATIONS

3rd Generation Partnership Project; Technical Specification Group Radio Access Network; Evolved Universal Terrestrial Radio Access (E-UTRA); Multiplexing and channel coding (Release 11), 3GPP TS 36.212, Jun. 2013, pp. 1-84, V11.10, France.

3rd Generation Partnership Project; Technical Specification Group Radio Access Network; Evolved Universal Terrestrial Radio Access (E-UTRA); Physical layer procedures (Release 11), 3GPP TS 36.211, Jun. 2013, pp. 1-176, V11.10, France.

LTE, "3rd Generation Partnership Project; Technical Specification Group Radio Access Network; Evolved Universal Terrestrial Radio Access (E-UTRA); Physical layer procedures (Release 11)," 3GPP TS 36.213, V11.3.0, France, Jun. 2013, pp. 1-176.

* cited by examiner

COMMUNICATION METHOD, USER EQUIPMENT, AND NETWORK DEVICE

This application is a continuation of International Application No. PCT/CN2013/080224, filed on Jul. 26, 2013, which is hereby incorporated by reference in its entirety.

TECHNICAL FIELD

Embodiments relate to the field of communications technologies, and in particular, to a communication method, user equipment, and a network device.

BACKGROUND

Direct communication between user equipment and generated services are referred to as device to device proximity services (D2D ProSe), have become a research subject in a system of the 3rd Generation Partnership Project (3GPP) Long Term Evolution (LTE) Re1.12, and are supported starting from the Re1.12 system. The direct communication between user equipments includes a discovery signal process and a direct communication process. The discovery signal process includes sending a discovery signal and receiving the discovery signal. The direct communication process includes a series of processes of call initiation, channel measurement, channel feedback, resource scheduling, data transmission, call completion, and the like.

After one user equipment requests a network device to allow the user equipment to perform direct communication with another user equipment, the network device sends a paging message to the other user equipment in multiple cells within a range of a tracking area list of the another user equipment, for paging the user equipment. When a location of the user equipment in a cell included in the tracking area list changes and a cell is reselected, an update of the tracking area list is not triggered. An update procedure of the tracking area list is triggered only when a new cell to which the user equipment is handed over does not belong to the tracking area list. Therefore, the network device cannot determine which cell, in the tracking area list, in which the user equipment is currently located. The network device initiates paging in multiple cells in the tracking area list, which causes an unnecessary waste of resources.

SUMMARY

Embodiments provide a communication method, user equipment, and a network device, so as to save resources in a paging process of direct communication.

According to a first aspect, an embodiment provides a communication method, including: receiving, by first user equipment, a discovery message sent by second user equipment, where the discovery message indicates cell information of the second user equipment. The method also includes acquiring, by the first user equipment, the cell information of the second user equipment, and sending, by the first user equipment, a communication request to a network device according to the discovery message, where the communication request is used to request to communicate with the second user equipment, and the communication request indicates the cell information of the second user equipment, so that the network device sends a paging message to the second user equipment according to the communication request and a cell message of the second user equipment.

In a first implementation manner of the first aspect, the cell information of the second user equipment includes an identifier of a cell in which the second user equipment is located. The discovery message indicates cell information of the second user equipment includes thaT the discovery message carries the identifier of the cell in which the second user equipment is located. the acquiring, by the first user equipment, the cell information of the second user equipment includes reading, by the first user equipment, the identifier, which is carried in the discovery message, of the cell in which the second user equipment is located.

With reference to the first aspect, in a second implementation manner of the first aspect, the cell information of the second user equipment includes a discovery area identifier of the second user equipment. The discovery message indicates cell information of the second user equipment includes that the discovery message carries the discovery area identifier of the second user equipment. The acquiring, by the first user equipment, the cell information of the second user equipment includes reading, by the first user equipment, the discovery area identifier of the second user equipment that is carried in the discovery message.

With reference to the first aspect, in a third implementation manner of the first aspect, the cell information of the second user equipment includes a discovery area identifier of the second user equipment; that the discovery message indicates cell information of the second user equipment includes: the discovery message indicates the discovery area identifier of the second user equipment by using a codeword resource used by the discovery message, The acquiring, by the first user equipment, the cell information of the second user equipment includes determining, by the first user equipment, the discovery area identifier of the second user equipment according to a correspondence between a discovery area identifier and a codeword resource, and the codeword resource used by the discovery message.

With reference to the third implementation manner of the first aspect, in a fourth implementation manner of the first aspect, the codeword resource includes a scrambling codeword, and the correspondence between a discovery area identifier and a codeword resource includes a correspondence between a discovery area identifier and a scrambling codeword; and the acquiring, by the first user equipment, the cell information of the second user equipment further includes: descrambling, by the first user equipment, the discovery message by using at least one scrambling codeword, and determining that a scrambling codeword that is used to perform the descrambling successfully is a scrambling codeword used by the discovery message.

With reference to the first aspect, in a fifth implementation manner of the first aspect, the codeword resource includes a demodulation reference symbol sequence, and the correspondence between a discovery area identifier and a codeword resource includes a correspondence between a discovery area identifier and a demodulation reference symbol sequence. The acquiring, by the first user equipment, the cell information of the second user equipment further includes performing, by the first user equipment, channel estimation and decoding on the discovery message by using at least one demodulation reference symbol sequence, and determining that a demodulation reference symbol sequence that is used to perform the channel estimation and decoding successfully is a demodulation reference symbol sequence used by the discovery message.

With reference to the first aspect, in a sixth implementation manner of the first aspect, the cell information of the second user equipment includes a discovery area identifier of the second user equipment. The discovery message indicates cell information of the second user equipment includes: the discovery message indicates the discovery area identifier of the second user equipment by using a frequency resource used by the discovery message. The acquiring, by the first user equipment, the cell information of the second user equipment includes determining, by the first user equipment, the discovery area identifier of the second user equipment according to a correspondence between a discovery area identifier and a frequency resource, and the frequency resource used by the discovery message.

With reference to the first aspect, in a seventh implementation manner of the first aspect, the cell information of the second user equipment includes a discovery area identifier of the second user equipment. The discovery message indicates cell information of the second user equipment includes that the discovery message indicates the discovery area identifier of the second user equipment by using a time resource used by the discovery message. The acquiring, by the first user equipment, the cell information of the second user equipment includes determining, by the first user equipment, the discovery area identifier of the second user equipment according to a correspondence between a discovery area identifier and a time resource, and the time resource used by the discovery message.

According to a second aspect, an embodiment further provides a communication method, including generating, by second user equipment, a discovery message; and sending, by the second user equipment, the discovery message, where the discovery message indicates cell information of the second user equipment, so that first user equipment that receives the discovery message sends a communication request to a network device according to the discovery message, where the communication request is used to request to communicate with the second user equipment, and the communication request indicates the cell information of the second user equipment, so that the network device sends a paging message to the second user equipment according to the communication request and a cell message of the second user equipment.

With reference to the second aspect, in a first implementation manner of the second aspect, the cell information of the second user equipment includes an identifier of a cell in which the second user equipment is located; and that the discovery message indicates cell information of the second user equipment includes: the discovery message carries the identifier of the cell in which the second user equipment is located.

With reference to the second aspect, in a second implementation manner of the second aspect, the cell information of the second user equipment includes a discovery area identifier of the second user equipment; and that the discovery message indicates cell information of the second user equipment includes: the discovery message carries the discovery area identifier of the second user equipment.

With reference to the second aspect, in a third implementation manner of the second aspect, the cell information of the second user equipment includes a discovery area identifier of the second user equipment; the method further includes: determining, by the second user equipment according to a correspondence between a discovery area identifier and a codeword resource, and the discovery area identifier of the second user equipment, a codeword resource corresponding to the discovery area identifier of the second user equipment; the sending, by the second user equipment, the discovery message includes: sending, by the second user equipment, the discovery message by using the codeword resource corresponding to the discovery area identifier of the second user equipment; and that the discovery message indicates cell information of the second user equipment includes: the discovery message indicates the discovery area identifier of the second user equipment by using the codeword resource used by the discovery message.

With reference to the second aspect, in a fourth implementation manner of the second aspect, the cell information of the second user equipment includes a discovery area identifier of the second user equipment; the method further includes: acquiring, by the second user equipment, a codeword resource used by a current cell; the sending, by the second user equipment, the discovery message includes: sending, by the second user equipment, the discovery message by using the codeword resource used by the current cell; and that the discovery message indicates cell information of the second user equipment includes: the discovery message indicates the discovery area identifier of the second user equipment by using the codeword resource used by the discovery message.

With reference to the second aspect, in a fifth implementation manner of the second aspect, the codeword resource includes a scrambling codeword, and the correspondence between a discovery area identifier and a codeword resource includes a correspondence between a discovery area identifier and a scrambling codeword.

With reference to the second aspect, in a sixth implementation manner of the second aspect, the codeword resource includes a demodulation reference symbol sequence, and the correspondence between a discovery area identifier and a codeword resource includes a correspondence between a discovery area identifier and a demodulation reference symbol sequence.

With reference to the second aspect, in a seventh implementation manner of the second aspect, the cell information of the second user equipment includes a discovery area identifier of the second user equipment; the sending, by the second user equipment, the discovery message includes determining, by the second user equipment according to a correspondence between a discovery area identifier and a frequency resource, and the discovery area identifier of the second user equipment, a frequency resource corresponding to the discovery area identifier of the second user equipment; and sending, by the second user equipment, the discovery message by using the frequency resource corresponding to the discovery area identifier of the second user equipment; and that the discovery message indicates cell information of the second user equipment includes the discovery message indicates the discovery area identifier of the second user equipment by using the frequency resource used by the discovery message.

With reference to the second aspect, in an eighth implementation manner of the second aspect, the cell information of the second user equipment includes a discovery area identifier of the second user equipment; the method further includes: acquiring, by the second user equipment, a frequency resource used by a current cell; the sending, by the second user equipment, the discovery message includes: sending, by the second user equipment, the discovery message by using the frequency resource used by the current cell; and that the discovery message indicates cell information of the second user equipment includes the discovery message indicates the discovery area identifier of the second user equipment by using the frequency resource used by the discovery message.

With reference to the second aspect, in a ninth implementation manner of the second aspect, the cell information of the second user equipment includes a discovery area identifier of the second user equipment; the sending, by the second user equipment, the discovery message includes: determining, by the second user equipment according to a correspondence between a discovery area identifier and a time resource, and the discovery area identifier of the second user equipment, a time resource corresponding to the discovery area identifier of the second user equipment; and sending, by the second user equipment, the discovery message by using the time resource corresponding to the discovery area identifier of the second user equipment; and that the discovery message indicates cell information of the second user equipment includes: the discovery message indicates the discovery area identifier of the second user equipment by using the time resource used by the discovery message.

With reference to the second aspect, in a tenth implementation manner of the second aspect, the cell information of the second user equipment includes a discovery area identifier of the second user equipment; the method further includes: acquiring, by the second user equipment, a time resource used by a current cell; the sending, by the second user equipment, the discovery message includes: sending, by the second user equipment, the discovery message by using the time resource used by the current cell; and that the discovery message indicates cell information of the second user equipment includes: the discovery message indicates the discovery area identifier of the second user equipment by using the time resource used by the discovery message.

According to a third aspect, an embodiment provides a communication method, including: receiving, by a network device, a communication request sent by first user equipment, where the communication request is used by the first user equipment to request to communicate with second user equipment, and the communication request indicates cell information of the second user equipment; and sending, by the network device, a paging message to the second user equipment according to the communication request and the cell information of the second user equipment.

With reference to the third aspect, in a first implementation manner of the third aspect, the cell information of the second user equipment includes an identifier of a cell in which the second user equipment is located or a discovery area identifier of the second user equipment; and the sending a paging message to the second user equipment includes: sending, in the cell in which the second user equipment is located, the paging message to the second device according to the identifier of the cell in which the second user equipment is located; or sending, in a discovery area of the second user equipment, the paging message to the second user equipment according to the discovery area identifier of the second user equipment.

With reference to the third aspect, in a second implementation manner of the third aspect, the sending, in a discovery area of the second user equipment, the paging message to the second user equipment is specifically: sending, in an intersection area of the discovery area of the second user equipment and a tracking area of the second user equipment, the paging message to the second user equipment.

With reference to the third aspect, in a third implementation manner of the third aspect, the method further includes: sending, by the network device, a correspondence between a cell and a discovery area identifier to the second user equipment, so that the second user equipment determines the discovery area identifier of the second user equipment according to the correspondence between a cell and a discovery area identifier, and the cell in which the second user equipment is located.

With reference to the third aspect, in a fourth implementation manner of the third aspect, the method further includes: sending, by the network device, a correspondence between a discovery area identifier and a physical resource to the second user equipment, where the physical resource includes a codeword resource, a frequency resource, or a time resource.

With reference to the third aspect, in a fifth implementation manner of the third aspect, the method further includes: sending, by the network device, a physical resource used by a current cell of the second user equipment to the second user equipment, where the physical resource includes a codeword resource, a frequency resource, or a time resource.

With reference to the third aspect, in a sixth implementation manner of the third aspect, the codeword resource includes a scrambling codeword, a demodulation reference symbol sequence, or a bearer signal sequence.

According to a fourth aspect, an embodiment provides a paging method, including: receiving, by a network device, a communication request sent by first user equipment, where the communication request is used to request to communicate with second user equipment; determining, by the network device according to the communication request, a cell in which the first user equipment is located; and sending, by the network device in the cell in which the first user equipment is located, a paging message to the second user equipment; or sending, by the network device in the cell in which the first user equipment is located and an adjacent cell of the cell, a paging message to the second user equipment.

With reference to the fourth aspect, in a first implementation manner of the fourth aspect, the sending, by the network device in the cell in which the first user equipment is located and an adjacent cell of the cell, a paging message to the second user equipment is specifically sending, by the network device in the cell in which the first user equipment is located and an intersection area of the adjacent cell of the first cell and a tracking area of the second user equipment, the paging message to the second user equipment.

According to a fifth aspect, an embodiment further provides user equipment, including a receiver, configured to receive a discovery message sent by second user equipment, where the discovery message indicates cell information of the second user equipment; a processor, configured to acquire the cell information of the second user equipment; and a transmitter, configured to send a communication request to a network device according to the discovery message, where the communication request is used to request to communicate with the second user equipment, and the communication request indicates the cell information of the second user equipment, so that the network device sends a paging message to the second user equipment according to the communication request and a cell message of the second user equipment.

With reference to the fifth aspect, in a first implementation manner of the fifth aspect, the cell information of the second user equipment includes an identifier of a cell in which the second user equipment is located. That the discovery message indicates cell information of the second user equipment includes: the discovery message carries the identifier of the cell in which the second user equipment is located; and the processor is specifically configured to read the identifier, which is carried in the discovery message, of the cell in which the second user equipment is located.

With reference to the fifth aspect, in a second implementation manner of the fifth aspect, the cell information of the second user equipment includes a discovery area identifier of the second user equipment; that the discovery message indicates cell information of the second user equipment includes: the discovery message carries the discovery area identifier of the second user equipment; and the processor is specifically configured to read the discovery area identifier of the second user equipment that is carried in the discovery message.

With reference to the fifth aspect, in a second implementation manner of the fifth aspect, the cell information of the second user equipment includes a discovery area identifier of the second user equipment; that the discovery message indicates cell information of the second user equipment includes: the discovery message indicates the discovery area identifier of the second user equipment by using a codeword resource used by the discovery message; and the processor is specifically configured to determine the discovery area identifier of the second user equipment according to a correspondence between a discovery area identifier and a codeword resource, and the codeword resource used by the discovery message.

With reference to the fifth aspect, in a third implementation manner of the fifth aspect, the codeword resource includes a scrambling codeword, and the correspondence between a discovery area identifier and a codeword resource includes a correspondence between a discovery area identifier and a scrambling codeword; and the processor is further configured to descramble the discovery message by using at least one scrambling codeword, and determine that a scrambling codeword that is used to perform the descrambling successfully is a scrambling codeword used by the discovery message.

With reference to the fifth aspect, in a fourth implementation manner of the fifth aspect, the codeword resource includes a demodulation reference symbol sequence, and the correspondence between a discovery area identifier and a codeword resource includes a correspondence between a discovery area identifier and a demodulation reference symbol sequence; and the processor is further configured to perform channel estimation and decoding on the discovery message by using at least one demodulation reference symbol sequence, and determine that a demodulation reference symbol sequence that is used to perform the channel estimation and decoding successfully is a demodulation reference symbol sequence used by the discovery message.

With reference to the fifth aspect, in a fifth implementation manner of the fifth aspect, the cell information of the second user equipment includes a discovery area identifier of the second user equipment; that the discovery message indicates cell information of the second user equipment includes: the discovery message indicates the discovery area identifier of the second user equipment by using a frequency resource used by the discovery message; and the processor is specifically configured to determine the discovery area identifier of the second user equipment according to a correspondence between a discovery area identifier and a frequency resource, and the frequency resource used by the discovery message.

With reference to the fifth aspect, in a sixth implementation manner of the fifth aspect, the cell information of the second user equipment includes a discovery area identifier of the second user equipment; that the discovery message indicates cell information of the second user equipment includes: the discovery message indicates the discovery area identifier of the second user equipment by using a time resource used by the discovery message; and the processor is specifically configured to determine the discovery area identifier of the second user equipment according to a correspondence between a discovery area identifier and a time resource, and the time resource used by the discovery message.

According to a sixth aspect, an embodiment provides user equipment, where the user equipment is second user equipment, and includes: a processor, configured to generate a discovery message; and a transmitter, configured to send the discovery message, where the discovery message indicates cell information of the second user equipment, so that first user equipment that receives the discovery message sends a communication request to a network device according to the discovery message, where the communication request is used to request to communicate with the second user equipment, and the communication request indicates the cell information of the second user equipment, so that the network device sends a paging message to the second user equipment according to the communication request and a cell message of the second user equipment.

With reference to the sixth aspect, in a first implementation manner of the sixth aspect, the cell information of the second user equipment includes an identifier of a cell in which the second user equipment is located; and that the discovery message indicates cell information of the second user equipment includes: the discovery message carries the identifier of the cell in which the second user equipment is located.

With reference to the sixth aspect, in a second implementation manner of the sixth aspect, the cell information of the second user equipment includes a discovery area identifier of the second user equipment; and that the discovery message indicates cell information of the second user equipment includes: the discovery message carries the discovery area identifier of the second user equipment.

With reference to the sixth aspect, in a third implementation manner of the sixth aspect, the cell information of the second user equipment includes a discovery area identifier of the second user equipment; the processor is further configured to determine, according to a correspondence between a discovery area identifier and a codeword resource, and the discovery area identifier of the second user equipment, a codeword resource corresponding to the discovery area identifier of the second user equipment; the transmitter is specifically configured to send the discovery message by using the codeword resource corresponding to the discovery area identifier of the second user equipment; and that the discovery message indicates cell information of the second user equipment includes: the discovery message indicates the discovery area identifier of the second user equipment by using the codeword resource used by the discovery message.

With reference to the sixth aspect, in a fourth implementation manner of the sixth aspect, the cell information of the second user equipment includes a discovery area identifier of the second user equipment. The user equipment further includes: a first receiver, configured to acquire a codeword resource used by a current cell. The transmitter is specifically configured to send the discovery message by using the codeword resource used by the current cell. That the discovery message indicates cell information of the second user equipment includes: the discovery message indicates the discovery area identifier of the second user equipment by using the codeword resource used by the discovery message.

With reference to the sixth aspect, in a fifth implementation manner of the sixth aspect, the codeword resource includes a scrambling codeword, and the correspondence between a discovery area identifier and a codeword resource includes a correspondence between a discovery area identifier and a scrambling codeword.

With reference to the sixth aspect, in a sixth implementation manner of the sixth aspect, the codeword resource includes a demodulation reference symbol sequence, and the correspondence between a discovery area identifier and a codeword resource includes a correspondence between a discovery area identifier and a demodulation reference symbol sequence.

With reference to the sixth aspect, in a seventh implementation manner of the sixth aspect, the cell information of the second user equipment includes a discovery area identifier of the second user equipment. The transmitter is specifically configured to: determine, according to a correspondence between a discovery area identifier and a frequency resource, and the discovery area identifier of the second user equipment, a frequency resource corresponding to the discovery area identifier of the second user equipment; and send, by the second user equipment, the discovery message by using the frequency resource corresponding to the discovery area identifier of the second user equipment. That the discovery message indicates cell information of the second user equipment includes: the discovery message indicates the discovery area identifier of the second user equipment by using the frequency resource used by the discovery message.

With reference to the sixth aspect, in an eighth implementation manner of the sixth aspect, the cell information of the second user equipment includes a discovery area identifier of the second user equipment. The user equipment further includes: a second receiver, configured to acquire a frequency resource used by a current cell. The transmitter is specifically configured to send the discovery message by using the frequency resource used by the current cell; and that the discovery message indicates cell information of the second user equipment includes: the discovery message indicates the discovery area identifier of the second user equipment by using the frequency resource used by the discovery message.

With reference to the sixth aspect, in a ninth implementation manner of the sixth aspect, the cell information of the second user equipment includes a discovery area identifier of the second user equipment; the transmitter is specifically configured to: determine, according to a correspondence between a discovery area identifier and a time resource, and the discovery area identifier of the second user equipment, a time resource corresponding to the discovery area identifier of the second user equipment; and send, by the second user equipment, the discovery message by using the time resource corresponding to the discovery area identifier of the second user equipment; and that the discovery message indicates cell information of the second user equipment includes: the discovery message indicates the discovery area identifier of the second user equipment by using the time resource used by the discovery message.

With reference to the sixth aspect, in a tenth implementation manner of the sixth aspect, the cell information of the second user equipment includes a discovery area identifier of the second user equipment; the user equipment further includes: a third receiver, configured to acquire a time resource used by a current cell; the transmitter is specifically configured to send the discovery message by using the time resource used by the current cell; and that the discovery message indicates cell information of the second user equipment includes: the discovery message indicates the discovery area identifier of the second user equipment by using the time resource used by the discovery message.

According to a seventh aspect, an embodiment provides a network device, including: a receiver, configured to receive a communication request sent by first user equipment, where the communication request is used by the first user equipment to request to communicate with second user equipment, and the communication request indicates cell information of the second user equipment; and a transmitter, configured to send a paging message to the second user equipment according to the communication request and the cell information of the second user equipment.

With reference to the seventh aspect, in a first implementation manner of the seventh aspect, the cell information of the second user equipment includes an identifier of a cell in which the second user equipment is located or a discovery area identifier of the second user equipment; and the transmitter is specifically configured to: send, in the cell in which the second user equipment is located, the paging message to the second device according to the identifier of the cell in which the second user equipment is located; or send, in a discovery area of the second user equipment, the paging message to the second user equipment according to the discovery area identifier of the second user equipment.

With reference to the seventh aspect, in a second implementation manner of the seventh aspect, the sending, by the transmitter in a discovery area of the second user equipment, the paging message to the second user equipment is specifically: sending, in an intersection area of the discovery area of the second user equipment and a tracking area of the second user equipment, the paging message to the second user equipment.

With reference to the seventh aspect, in a third implementation manner of the seventh aspect, the transmitter is further configured to send a correspondence between a cell and a discovery area identifier to the second user equipment, so that the second user equipment determines the discovery area identifier of the second user equipment according to the correspondence between a cell and a discovery area identifier, and a cell in which the second user equipment is located.

With reference to the seventh aspect, in a fourth implementation manner of the seventh aspect, the transmitter is further configured to send a correspondence between a discovery area identifier and a physical resource to the second user equipment, where the physical resource includes a codeword resource, a frequency resource, or a time resource.

With reference to the seventh aspect, in a fifth implementation manner of the seventh aspect, the transmitter is further configured to send a physical resource used by a current cell of the second user equipment to the second user equipment, where the physical resource includes a codeword resource, a frequency resource, or a time resource.

With reference to the seventh aspect, in a sixth implementation manner of the seventh aspect, the codeword resource includes a scrambling codeword, a demodulation reference symbol sequence, or a bearer signal sequence.

According to an eighth aspect, an embodiment further provides a network device, including: a receiver, configured to receive a communication request sent by first user equipment, where the communication request is used to request to communicate with second user equipment; a processor, configured to determine, according to the communication request, a cell in which the first user equipment is located; and a transmitter, configured to: send, in the cell in which the first user equipment is located, a paging message to the second user equipment; or send, in the cell in which the first user equipment is located and an adjacent cell of the cell, a paging message to the second user equipment.

With reference to the eighth aspect, in a first implementation manner of the eighth aspect, the sending, by a transmitter in the cell in which the first user equipment is located and an adjacent cell of the cell, a paging message to the second user equipment is specifically: sending, in the cell in which the first user equipment is located and an intersection area of the adjacent cell of the first cell and a tracking area of the second user equipment, the paging message to the second user equipment.

The embodiments provide the communication method, the user equipment, and the network device. A discovery message sent by second user equipment indicates cell information of the user equipment, so that first user equipment that receives the discovery message sends a communication request to a network device according to the discovery message, where the communication request indicates the cell information of the second user equipment, so that the network device sends a paging message to the second user equipment according to a cell message of the second user equipment, which narrows down a range within which the network device initiates the paging message to the second user equipment, and saves resources used in a paging process of direct communication.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Technologies described in this specification may be applied to various communications systems, for example, current 2 G and 3 G communications systems and a next-generation communications system, for example, a Global System for Mobile Communications (GSM), a Code Division Multiple Access (CDMA) system, a Time Division Multiple Access (TDMA) system, Wideband Code Division Multiple Access (WCDMA), a Frequency Division Multiple Access (FDMA) system, an Orthogonal Frequency Division Multiple Access (OFDMA) system, a single-carrier FDMA (SC-FDMA) system, a general packet radio service (GPRS) system, a Long Term Evolution (LTE) system, and other communications systems.

User equipment involved in this application may be a wireless terminal or a wired terminal. The wireless terminal may refer to a device that provides voice and/or data connectivity to a user, a handheld device with a wireless connection function, or another processing device connected to a wireless modem. The wireless terminal may communicate with one or more core networks by using a radio access network (RAN). The wireless terminal may be a mobile terminal, such as a mobile phone (or referred to as a "cellular" phone), and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, an access point, a remote terminal, an access terminal, a user terminal, a user agent, a user device, or user equipment.

A network device involved in this application may be a base station. The base station may be a base station (BTS, Base Transceiver Station) in GSM or CDMA, may be a base station (NodeB) in WCDMA, or may be an evolved base station (NodeB, eNB, or e-NodeB, evolutional Node B) in LTE, which is not limited in this application.

Figure 1:
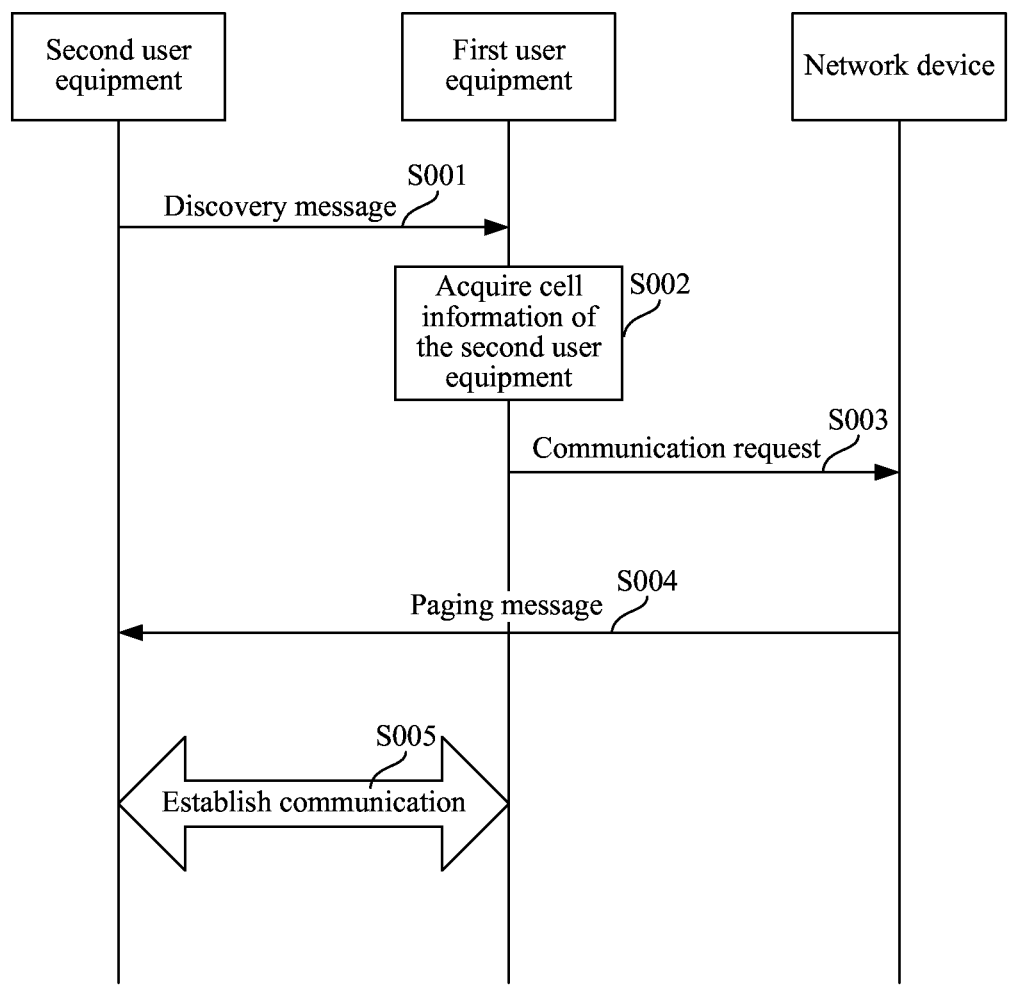
FIG. 1 is a schematic diagram of a basic process of initiating a discovery message and establishing direct communication between user equipments.

As shown in FIG. 1, in an embodiment, a basic process of initiating a discovery message and establishing direct communication between user equipment includes the following steps.

S001: Second user equipment sends a discovery message, where the discovery message carries cell information of the second user equipment.

It should be noted that, after the second user equipment sends the discovery message, one or more user equipments in a network can receive the discovery message, and user equipment that needs to communicate with the second user equipment may send a communication request to a network device according to the discovery message. In the present invention, an example in which first user equipment needs to perform direct communication with the second user equipment is used for description. The first user equipment may be any user equipment in the network.

S002: First user equipment receives the discovery message of the second user equipment, and acquires the cell information of the second user equipment.

S003: The first user equipment sends a communication request to a network device according to the discovery message, where the communication request is used to request to communicate with the second user equipment, and the communication request indicates the cell information of the second user equipment.

S004: The network device sends a paging message to the second user equipment according to the cell information of the second user equipment.

S005: The first user equipment establishes communication with the second user equipment.

Figure 2:
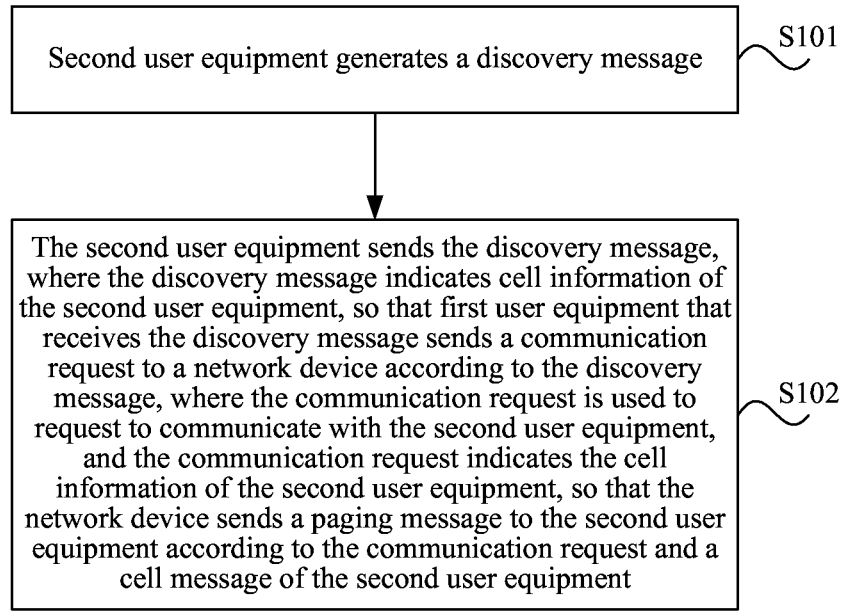
FIG. 2 is a flowchart of an embodiment of a communication method.

FIG. 2 is a flowchart of an embodiment of a communication method. As shown in FIG. 2, the method includes the following steps.

S101: Second user equipment generates a discovery message.

S102: The second user equipment sends the discovery message, where the discovery message indicates cell information of the second user equipment, so that first user equipment that receives the discovery message sends a communication request to a network device according to the discovery message, where the communication request is used to request to communicate with the second user equipment, and the communication request indicates the cell information of the second user equipment, so that the network device sends a paging message to the second user equipment according to the communication request and a cell message of the second user equipment.

In this embodiment, both the first user equipment and the second user equipment may be any user equipment that can perform direct communication in a communications system.

As one feasible implementation manner, the discovery message may indicate the cell information of the second user equipment in an explicit manner.

Optionally, the cell information of the second user equipment may be an identifier of a cell in which the second user equipment is located. In this implementation scenario, the second user equipment may directly include the identifier of the cell in which the second user equipment is located in the discovery message. That is, a field in the discovery message is used to carry the identifier of the cell. For example, there are 503 cells in total in an LTE system, and 9 Bits in a discovery message need to be occupied to indicate an identifier of a cell.

Optionally, the cell information of the second user equipment may be a discovery area identifier (discovery area ID) of the second user equipment. In this embodiment of the present invention, a discovery area may include one cell or may include multiple cells, and an ID thereof may be named by using a simple sequence number, for example, 1, 2, 3, or 4, or may be named in another manner. Compared with a cell identifier, a discovery area ID is shorter and occupies fewer characters and less signaling. A division rule of the discovery area may be delivered by the network device to user equipment in each cell. In this implementation scenario, the second user equipment may directly include the discovery area identifier of the second user equipment in the discovery message.

As another feasible implementation manner, the discovery message may also indicate the cell information of the second user equipment in an implicit manner, which can avoid indicating the cell information of the second user equipment by occupying a character of the discovery message.

Optionally, the second user equipment may implicitly indicate the discovery area identifier of the second user equipment by using the discovery message.

In one implementation scenario, the second user equipment may determine, according to a correspondence between a discovery area identifier and a codeword resource, and the discovery area identifier of the second user equipment, a codeword resource corresponding to the discovery area identifier of the second user equipment. The correspondence between a discovery area identifier and a codeword resource may be a mapping relationship in a form of a list, and is indicated by using a mapping table, or may be calculated by using a set formula. It should be noted that the correspondence may be delivered by various types of network devices to the second user equipment, or may be pre-stored in the second user equipment. After determining the codeword resource corresponding to the discovery area identifier of the second user equipment, the second user equipment may send the discovery message by using the codeword resource corresponding to the discovery area identifier of the second user equipment. Correspondingly, the discovery message may indicate the discovery area identifier of the second user equipment by using the codeword resource used by the discovery message.

In another implementation scenario, the second user equipment may acquire a codeword resource used by a current cell. The second user equipment may receive the codeword resource used by the current cell of the second user equipment and delivered by various types of network devices. Then, the second user equipment may send the discovery message by using the codeword resource used by the current cell. Correspondingly, the discovery message may indicate the discovery area identifier of the second user equipment by using the codeword resource used by the discovery message.

Optionally, the codeword resource may be a scrambling codeword, and correspondingly, the correspondence between a discovery area identifier and a codeword resource may be a correspondence between a discovery area identifier and a scrambling codeword. In this implementation scenario, the second user equipment may scramble the discovery message by using the scrambling codeword, and send a scrambled discovery message.

Optionally, the codeword resource may also be a demodulation reference symbol sequence, and correspondingly, the correspondence between a discovery area identifier and a codeword resource may be a correspondence between a discovery area identifier and a demodulation reference symbol sequence. In this implementation scenario, the second user equipment may demodulate the discovery message by using the demodulation reference symbol sequence.

In one implementation scenario, the second user equipment may determine, according to a correspondence between a discovery area identifier and a frequency resource, and the discovery area identifier of the second user equipment, a frequency resource corresponding to the discovery area identifier of the second user equipment. The correspondence between a discovery area identifier and a frequency resource may be a mapping relationship in a form of a list, and is indicated by using a mapping table, or may be calculated by using a set formula. It should be noted that the correspondence may be delivered by various types of network devices to the second user equipment, or may be pre-stored in the second user equipment. After the second user equipment determines the frequency resource corresponding to the discovery area identifier of the second user equipment, the second user equipment may send the discovery message by using the frequency resource corresponding to the discovery area identifier of the second user equipment. Correspondingly, the discovery message may indicate the discovery area identifier of the second user equipment by using the frequency resource used by the discovery message.

In another implementation scenario, the second user equipment may acquire a frequency resource used by a current cell. The second user equipment may receive the frequency resource used by the current cell of the second user equipment and delivered by various types of network devices. Then, the second user equipment may send the discovery message by using the frequency resource used by the current cell. Correspondingly, the discovery message may indicate the discovery area identifier of the second user equipment by using the frequency resource used by the discovery message.

Optionally, the frequency resource may be a physical resource block pair (PRB pair) resource or a subcarrier resource. Correspondingly, the correspondence may be a correspondence between a discovery area identifier and a PRB pair or a correspondence between a discovery area identifier and a subcarrier resource.

In one implementation scenario, the second user equipment may determine, according to a correspondence between a discovery area identifier and a time resource, and the discovery area identifier of the second user equipment, a time resource corresponding to the discovery area identifier of the second user equipment. The correspondence between a discovery area identifier and a time resource may be a mapping relationship in a form of a list, and is indicated by using a mapping table, or may be calculated by using a set formula. It should be noted that the correspondence may be delivered by various types of network devices to the second user equipment, or may be pre-stored in the second user equipment. After the second user equipment determines the time resource corresponding to the discovery area identifier of the second user equipment, the second user equipment may send the discovery message by using the time resource corresponding to the discovery area identifier of the second user equipment. Correspondingly, the discovery message may indicate the discovery area identifier of the second user equipment by using the time resource used by the discovery message.

In another implementation scenario, the second user equipment may acquire a time resource used by a current cell. The second user equipment may receive the time resource used by the current cell of the second user equipment and delivered by various types of network devices. Then, the second user equipment may send the discovery message by using the time resource used by the current cell. Correspondingly, the discovery message may indicate the discovery area identifier of the second user equipment by using the time resource used by the discovery message.

Optionally, the time resource may be a data frame, a subframe, an orthogonal frequency division multiplexing OFDM symbol, or the like.

According to the communication method provided by this embodiment, a discovery message sent by second user equipment indicates cell information of the user equipment, so that first user equipment that receives the discovery message sends a communication request to a network device according to the discovery message, where the communication request indicates the cell information of the second user equipment, so that the network device sends a paging message to the second user equipment according to a cell message of the second user equipment, which narrows down a range within which the network device initiates the paging message to the second user equipment, and saves resources used in a paging process of direct communication.

Figure 3:
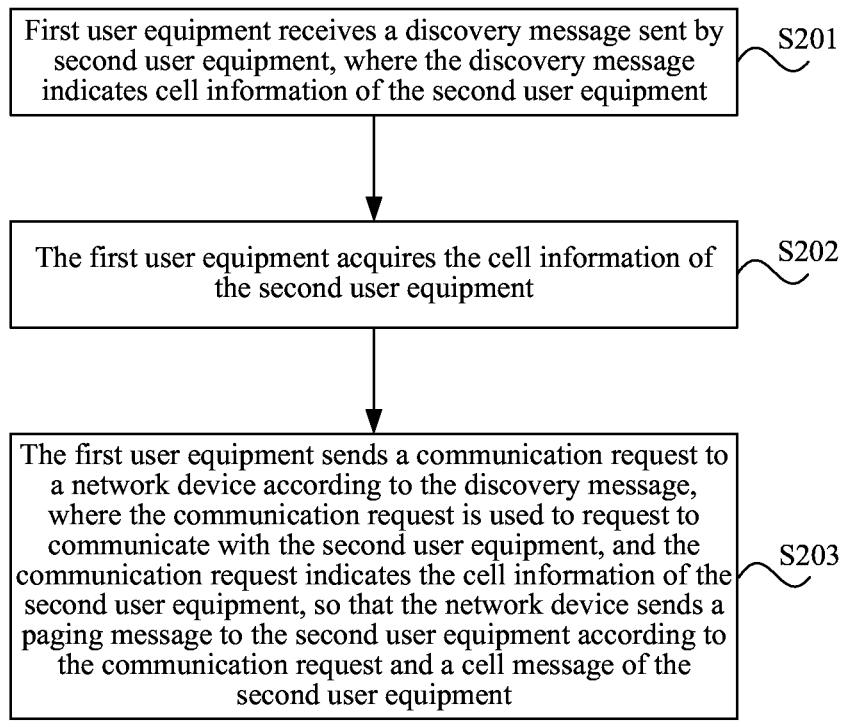
FIG. 3 is a flowchart of an embodiment of a communication method.

FIG. 3 is a flowchart of an embodiment of a signal transmission method. As shown in FIG. 3, the method includes the following steps.

S201: First user equipment receives a discovery message sent by second user equipment, where the discovery message indicates cell information of the second user equipment.

S202: The first user equipment acquires cell information of the second user equipment.

S203: The first user equipment sends a communication request to a network device according to the discovery message, where the communication request is used to request to communicate with the second user equipment, and the communication request indicates the cell information of the second user equipment, so that the network device sends a paging message to the second user equipment according to the communication request and a cell message of the second user equipment.

As one feasible implementation manner, the discovery message may indicate the cell information of the second user equipment in an explicit manner.

Optionally, the cell information of the second user equipment may be an identifier of a cell in which the second user equipment is located. The identifier of the cell in which the second user equipment is located may be directly carried in the discovery message. In this implementation scenario, the first user equipment may read the discovery message to acquire the identifier, which is carried in the discovery message, of the cell in which the second user equipment is located. That is, a field in the discovery message is used to carry the identifier of the cell. For example, there are 503 cells in total in an LTE system, and 9 Bits in a discovery message need to be occupied to indicate an identifier of a cell.

Optionally, the cell information of the second user equipment may be a discovery area identifier of the second user equipment. In this embodiment of the present invention, a discovery area may include one cell or may include multiple cells, and an ID thereof may be named by using a simple sequence number, for example, 1, 2, 3, or 4, or may be named in another manner. Compared with a cell identifier, a discovery area ID is shorter and occupies fewer characters and less signaling. A division rule of the discovery area may be delivered by the network device to user equipment in each cell. The discovery area identifier may be directly carried in the discovery message. In this implementation scenario, the first user equipment may read the discovery message to acquire the discovery area identifier of the second user equipment that is carried in the discovery message.

As another feasible implementation manner, the discovery message may also indicate the cell information of the second user equipment in an implicit manner, which can avoid indicating the cell information of the second user equipment by occupying a character of the discovery message.

The discovery message may implicitly indicate the discovery area identifier of the second user equipment. As one feasible embodiment, the discovery message may indicate the discovery area identifier of the second user equipment by using a codeword resource used by the discovery message. In this implementation scenario, the first user equipment may determine the discovery area identifier of the second user equipment according to a correspondence between a discovery area identifier and a codeword resource, and the codeword resource used by the discovery message. The correspondence between a discovery area identifier and a codeword resource may be a mapping relationship in a form of a list, and is indicated by using a mapping table, or may be calculated by using a set formula. It should be noted that the correspondence may be delivered by various types of network devices to the first user equipment, or may be pre-stored in the first user equipment.

In one optional implementation manner, the codeword resource may include a scrambling codeword, and correspondingly, the correspondence between a discovery area identifier and a codeword resource may be a correspondence between a discovery area identifier and a scrambling codeword. In this implementation scenario, the first user equipment may descramble the discovery message by using at least one scrambling codeword, and determine that a scrambling codeword that is used to perform the descrambling successfully is a scrambling codeword used by the discovery message. It should be noted that the first user equipment may perform the descrambling by using a group of candidate scrambling codewords, and these candidate scrambling codewords may be delivered by the network device to the first user equipment. The first user equipment may descramble the discovery message by using each of the candidate scrambling codewords separately. In this implementation scenario, after the descrambling operation, a parity check may be further performed on a scrambling codeword that has been used in the descrambling, and the scrambling codeword that is used to perform the descrambling successfully may be a scrambling codeword that is used to perform the descrambling successfully and succeeds in the parity check. The first user equipment may determine, according to the determined scrambling codeword used by the discovery message and the correspondence between a discovery area identifier and a scrambling codeword, a discovery area identifier of a cell in which the second user equipment is located.

In another optional implementation manner, the codeword resource may include a demodulation reference symbol sequence, and the correspondence between a discovery area identifier and a codeword resource includes a correspondence between a discovery area identifier and a demodulation reference symbol sequence. In this implementation scenario, the first user equipment may perform channel estimation and decoding on the discovery message by using at least one demodulation reference symbol sequence, and determine that a demodulation reference symbol sequence that is used to perform the channel estimation and decoding successfully is a demodulation reference symbol sequence used by the discovery message. It should be noted that the first user equipment may perform descrambling by using a group of candidate demodulation reference symbol sequences, and these candidate demodulation reference symbol sequences may be delivered by the network device to the first user equipment. The first user equipment may perform the channel estimation and decoding on the discovery message by using each of the candidate demodulation reference symbol sequences separately. In this implementation scenario, after the channel estimation and decoding operations, a parity check may be further performed, and the demodulation reference symbol sequence that is used to perform the channel estimation and decoding successfully may be a demodulation reference symbol sequence that is used to perform the channel estimation and decoding successfully and succeeds in the parity check. The first user equipment may determine, according to the determined demodulation reference symbol sequence used by the discovery message and the correspondence between a discovery area identifier and a demodulation reference symbol sequence, a discovery area identifier of a cell in which the second user equipment is located.

In one feasible implementation manner, the discovery message may also indicate the discovery area identifier of the second user equipment by using a frequency resource used by the discovery message. In this implementation scenario, the first user equipment may determine the discovery area identifier of the second user equipment according to a correspondence between a discovery area identifier and a frequency resource, and the frequency resource used by the discovery message. The correspondence between a discovery area identifier and a frequency resource may be a mapping relationship in a form of a list, and is indicated by using a mapping table, or may be calculated by using a set formula. It should be noted that the correspondence may be delivered by various types of network devices to the first user equipment, or may be pre-stored in the first user equipment.

In another feasible implementation manner, the discovery message may also indicate the discovery area identifier of the second user equipment by using a time resource used by the discovery message. In this implementation scenario, the first user equipment may also determine the discovery area identifier of the second user equipment according to a correspondence between a discovery area identifier and a time resource, and the time resource used by the discovery message. The correspondence between a discovery area identifier and a time resource may be a mapping relationship in a form of a list, and is indicated by using a mapping table, or may be calculated by using a set formula. It should be noted that the correspondence may be delivered by various types of network devices to the first user equipment, or may be pre-stored in the first user equipment.

After acquiring the cell information of the second user equipment, the first user equipment may send the communication request to the network device according to the discovery message, where the communication request is used to request to communicate with the second user equipment, and the communication request indicates the cell information of the second user equipment. Optionally, the communication request may indicate the cell information of the second user equipment in an explicit manner, or may indicate the cell information of the second user equipment in an implicit manner. A specific indication manner thereof is similar to an implementation method of indicating the cell information of the second user equipment by the discovery message, reference may be made to the foregoing description, and details are not provided herein again.

After receiving the request of the first user equipment, the network device may send the paging message to the second user equipment according to the communication request and the cell message of the second user equipment.

According to the communication method provided by this embodiment, first user equipment receives a discovery message that is sent by second user equipment and indicates cell information of the user equipment, so that the first user equipment that receives the discovery message sends a communication request to a network device according to the discovery message, where the communication request indicates the cell information of the second user equipment, so that the network device sends a paging message to the second user equipment according to a cell message of the second user equipment, which narrows down a range within which the network device initiates the paging message to the second user equipment, and saves resources used in a paging process of direct communication.

Figure 4:
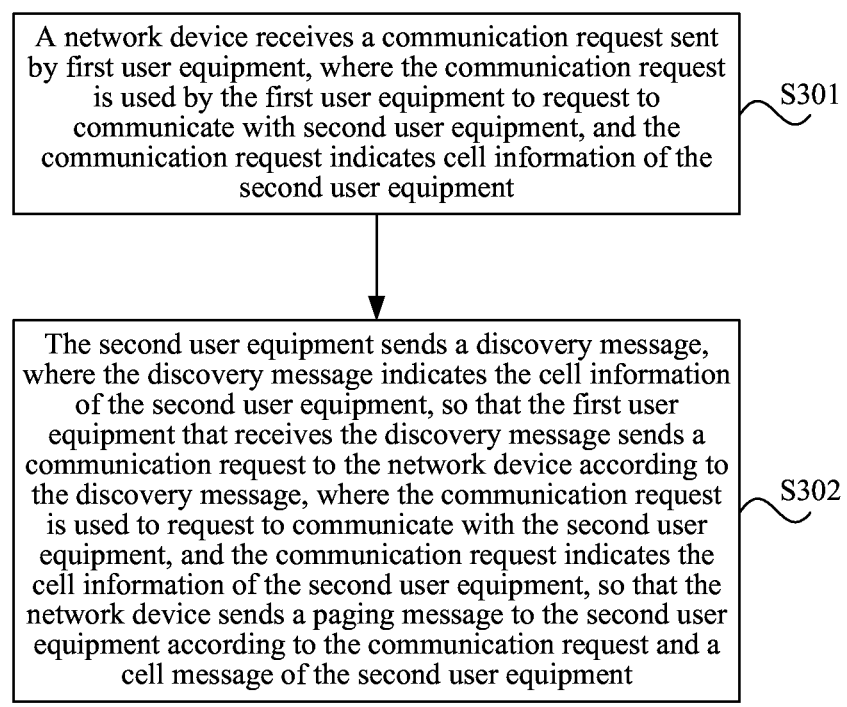
FIG. 4 is a flowchart of another embodiment of a communication method.

FIG. 4 is a flowchart of another embodiment of a communication method. As shown in FIG. 4, the method includes the following steps.

S301: A network device receives a communication request sent by first user equipment, where the communication request is used by the first user equipment to request to communicate with second user equipment, and the communication request indicates cell information of the second user equipment.

S302: The network device sends a paging message to the second user equipment according to the communication request and the cell information of the second user equipment.

Optionally, the cell information of the second user equipment may be an identifier of a cell in which the second user equipment is located. In this implementation scenario, the network device may send, in the cell in which the second user equipment is located, the paging message to the second device according to the identifier of the cell in which the second user equipment is located.

Optionally, the cell information of the second user equipment may also be a discovery area identifier of the second user equipment. In this implementation scenario, the network device may send, in a discovery area of the second user equipment, the paging message to the second user equipment according to the discovery area identifier of the second user equipment.

Further, the network device may send, in an intersection area of the discovery area of the second user equipment and a tracking area of the second user equipment, the paging message to the second user equipment.

Optionally, referring to the related description in the embodiment shown in FIG. 1, the network device may send a correspondence between a cell and a discovery area identifier to the second user equipment, so that the second user equipment determines the discovery area identifier of the second user equipment according to the correspondence between a cell and a discovery area identifier, and the cell in which the second user equipment is located.

Optionally, the network device may send, according to an area included in a tracking area list that is maintained by the network device and is of the second user equipment, the paging message in an intersection area of the area included in the tracking area list and a discovery area of the network device, so as to further narrow down a range within which the paging message is initiated.

Optionally, referring to the related description in the embodiment shown in FIG. 1, the network device may further send a correspondence between a discovery area identifier and a physical resource to the second user equipment, where the physical resource may include a codeword resource, a frequency resource, or a time resource.

Further, the network device may further send a physical resource used by a current cell of the second user equipment to the second user equipment, where the physical resource includes a codeword resource, a frequency resource, or a time resource. The codeword resource may include a scrambling codeword, a demodulation reference symbol sequence, or a bearer signal sequence, so that the second user equipment uses a corresponding resource to send a discovery signal.

Figure 5A:
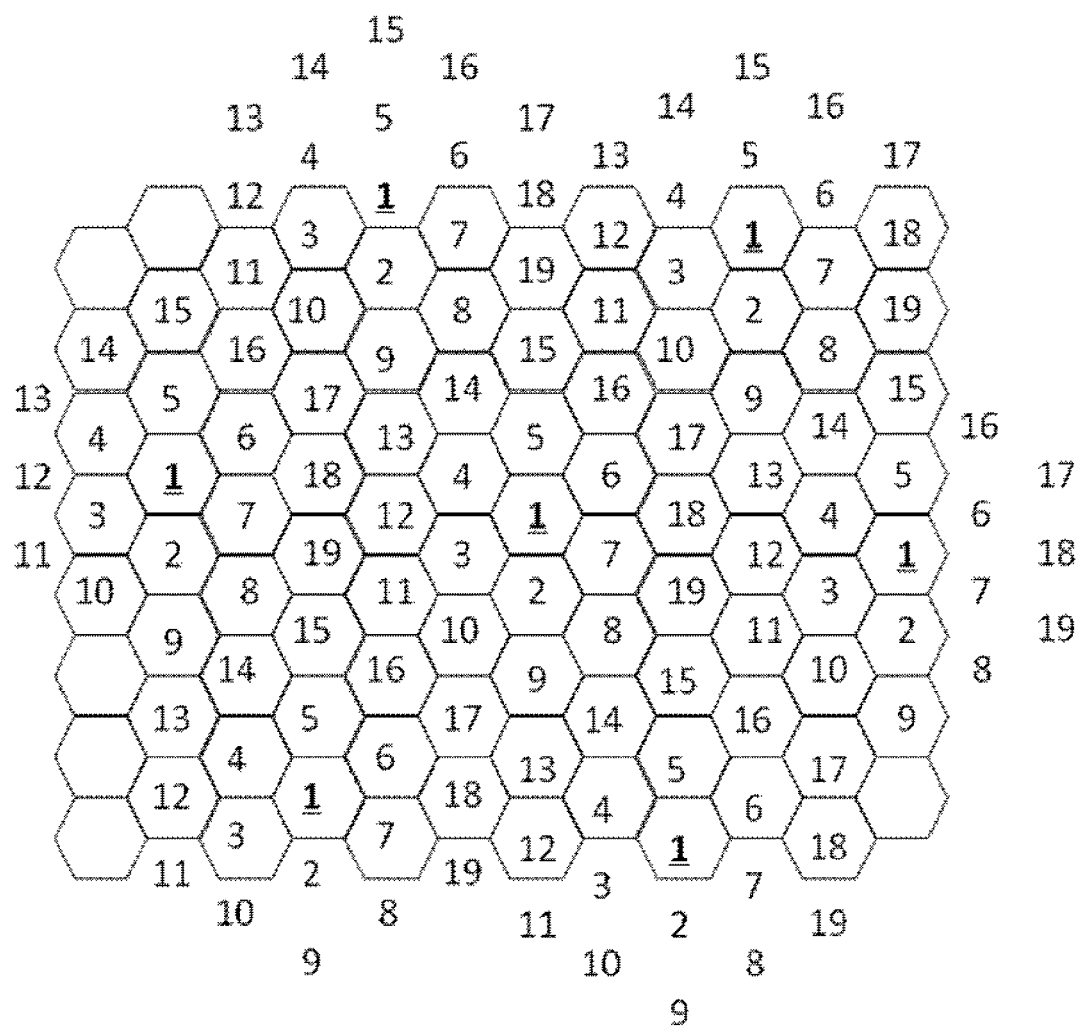
FIG. 5a is a schematic diagram 1 of multiplexing of discovery area identifiers.
Figure 5B:
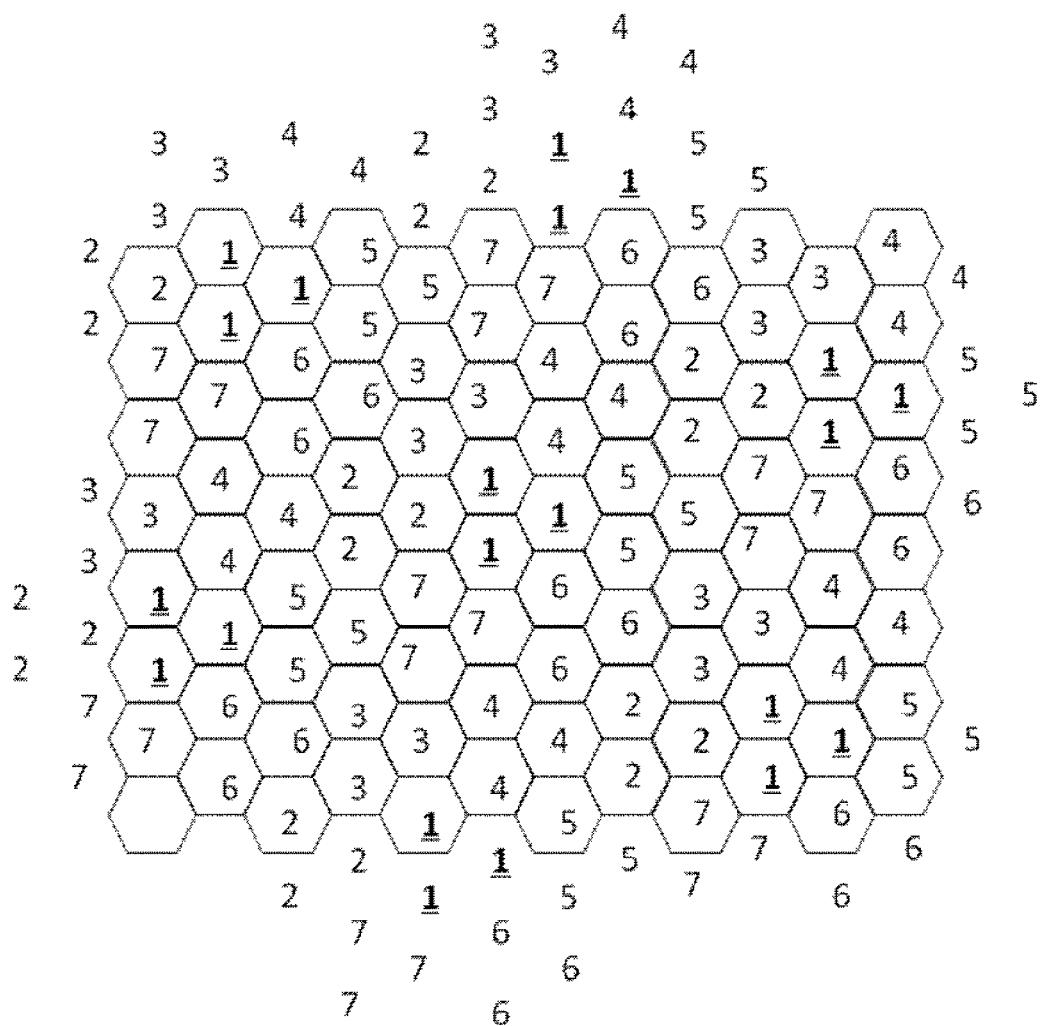
FIG. 5b is a schematic diagram 2 of multiplexing of discovery area identifiers.

It should be noted that a communications system generally includes a relatively large quantity of cells, for example, an LTE system including 504 cells; 9 bits in the discovery area identifier are required to indicate each of the 504 cells. Generally, a distance of D2D direct communication is relatively short. Therefore, a cell ID may be multiplexed within a system range. For example, as shown in FIG. 5a, discovery area identifiers of cells in an LTE system may be indicated as 1, 2, 3, ..., and 19 (which are merely used as an example for description), and these discovery area identifiers are multiplexed within a system range, so that 5 bits may be used to indicate a discovery area identifier. For another example, as shown in FIG. 5b, discovery area identifiers of cells in an LTE system may be indicated as 1, 2, ..., and 7, and these discovery area identifiers are multiplexed within a system range, so that 3 bits may be used to indicate a discovery area identifier. According to the communication method provided by this embodiment, first user equipment receives a discovery message that is sent by second user equipment and indicates cell information of the user equipment, so that the first user equipment that receives the discovery message sends a communication request to a network device according to the discovery message, where the communication request indicates the cell information of the second user equipment, so that the network device sends a paging message to the second user equipment according to a cell message of the second user equipment, which narrows down a range within which the network device initiates the paging message to the second user equipment, and saves resources used in a paging process of direct communication.

Figure 6:
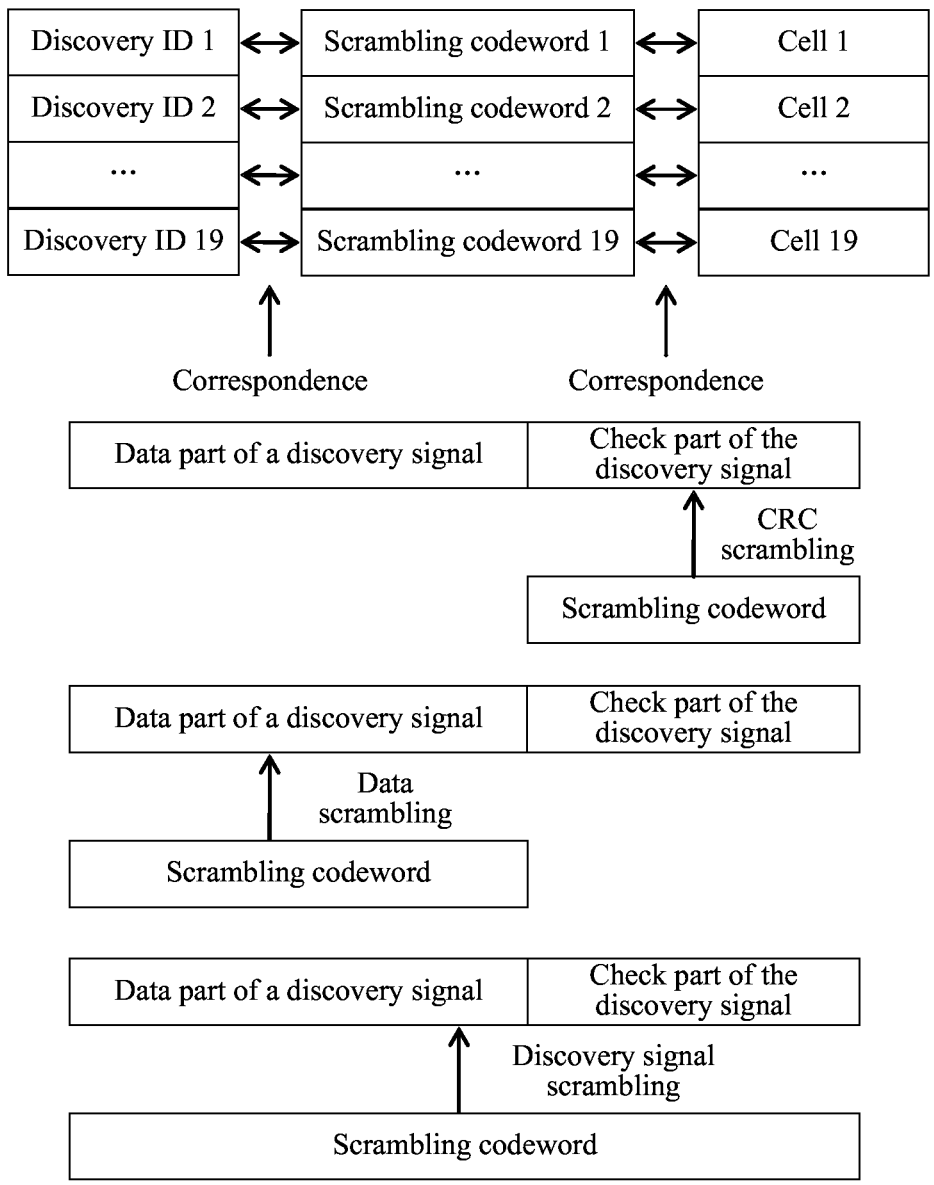
FIG. 6 is a schematic diagram of an embodiment of sending, by second user equipment, a discovery signal by using a scrambling codeword.

As shown in FIG. 6, in this embodiment, the communication method provided is described in detail by using an example in which second user equipment sends a discovery signal by using a scrambling codeword.

In FIG. 6, discovery area identifiers of cells in an LTE system are indicated as 1, 2, 3, ..., and 19. These 19 discovery area identifiers have a correspondence with a scrambling codeword 1, a scrambling codeword 2, a scrambling codeword 3, ..., and a scrambling codeword 19 respectively, and the scrambling codeword 1, the scrambling codeword 2, the scrambling codeword 3, ..., and the scrambling codeword 19 have a correspondence with a cell 1, a cell 2, a cell 3, ..., and a cell 19 respectively.

Specifically, the discovery area identifier 1 corresponds to the scrambling codeword 1, and the scrambling codeword 1 corresponds to the cell 1; the discovery area identifier 2 corresponds to the scrambling codeword 2, and the scrambling codeword 2 corresponds to the cell 2; ... ; the discovery area identifier 19 corresponds to the scrambling codeword 19, and the scrambling codeword 19 corresponds to the cell 19; and the rest may be deduced by analogy.

The second user equipment determines, according to a correspondence between a discovery area identifier and a scrambling codeword, and a discovery area identifier of the second user equipment, a scrambling codeword corresponding to the discovery area identifier of the second user equipment, so as to send a discovery message by using the codeword resource. Specifically, the discovery message (that is, a discovery signal) may include a data part of the discovery signal and a check part of the discovery signal. The second user equipment may scramble the discovery message by using the scrambling codeword corresponding to the discovery area identifier of the second user equipment. For example, as shown in FIG. 6, cyclic redundancy check (CRC) scrambling may be used, or the data part of the discovery signal may be scrambled, or the entire discovery signal may be scrambled. Herein, a specific scrambling manner is not limited.

After receiving the discovery message, first user equipment may determine the discovery area identifier of the second user equipment according to the correspondence between a discovery area identifier and a scrambling codeword and a scrambling code resource used by the discovery message. Specifically, the first user equipment may descramble the discovery message by using at least one scrambling codeword, and optionally, a network device may deliver a group of candidate scrambling codewords to the first user equipment to descramble the discovery message. Corresponding to scrambling, the first user equipment may perform CRC descrambling on the discovery message, may descramble the data part of the discovery signal, or may descramble the entire discovery signal. Further, the first user equipment may further perform a parity check on the descrambled discovery message, and a discovery area identifier corresponding to a scrambling codeword that succeeds in the check is the discovery area identifier of the second user equipment.

Figure 7:
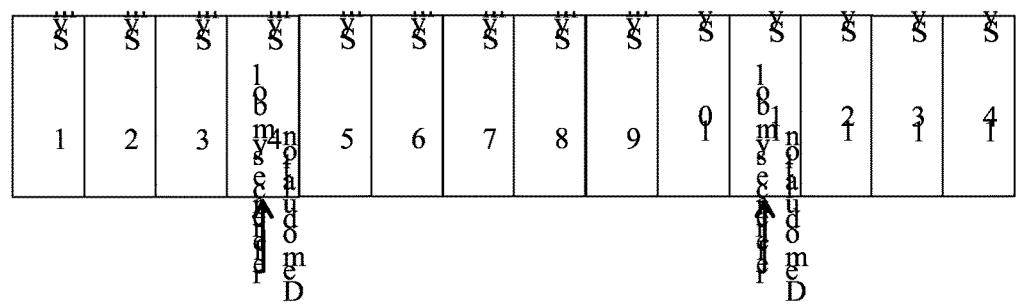
FIG. 7 is a schematic diagram of an embodiment of sending, by second user equipment, a discovery signal by using a demodulation reference symbol.
Figure 7:
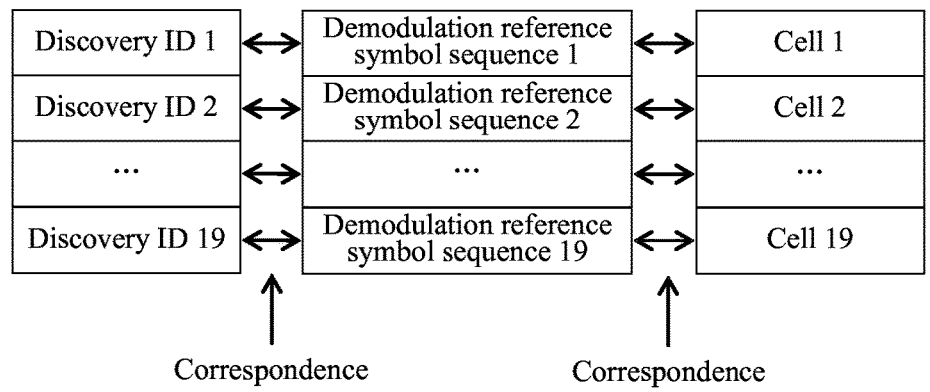

As shown in FIG. 7, in this embodiment, the communication method provided by the present invention is described in detail by using an example in which second user equipment sends a discovery signal by using a demodulation reference symbol sequence.

In FIG. 7, discovery area identifiers of cells in an LTE system are indicated as 1, 2, 3, . . . , and 19. These 19 discovery area identifiers have a correspondence with a demodulation reference symbol sequence 1, a demodulation reference symbol sequence 2, a demodulation reference symbol sequence 3, . . . , and a demodulation reference symbol sequence 19 respectively, and the demodulation reference symbol sequence 1, the demodulation reference symbol sequence 2, the demodulation reference symbol sequence 3, . . . , and the demodulation reference symbol sequence 19 have a correspondence with a cell 1, a cell 2, a cell 3, . . . , and a cell 19 respectively.

Specifically, the discovery area identifier 1 corresponds to the demodulation reference symbol sequence 1, and the demodulation reference symbol sequence 1 corresponds to the cell 1; the discovery area identifier 2 corresponds to the demodulation reference symbol sequence 2, and the demodulation reference symbol sequence corresponds to the cell 2; . . . ; the discovery area identifier 19 corresponds to the demodulation reference symbol sequence 19, and the demodulation reference symbol sequence 19 corresponds to the cell 19; and the rest may be deduced by analogy.

The second user equipment determines, according to a correspondence between a discovery area identifier and a demodulation reference symbol sequence, and a discovery area identifier of the second user equipment, a demodulation reference symbol sequence corresponding to the discovery area identifier of the second user equipment, so as to send a discovery message by using the demodulation reference symbol sequence. Specifically, the discovery message (that is, a discovery signal) may include 14 symbols, where a symbol 4 and a symbol 11 may be demodulation reference symbols. The second user equipment may send the demodulation reference symbols of the discovery message by using the demodulation reference symbol sequence corresponding to the discovery area identifier of the second user equipment.

After receiving the discovery message, first user equipment may determine the discovery area identifier of the second user equipment according to the correspondence between a discovery area identifier and a demodulation reference symbol sequence and the demodulation reference symbol sequence used by the discovery message. Specifically, the first user equipment may perform channel estimation and decoding on the discovery message by using at least one demodulation reference symbol sequence, and optionally, a network device may deliver a group of candidate demodulation reference symbol sequences to the first user equipment to perform the channel estimation and decoding on the discovery message. The first user equipment may further perform a parity check on the discovery message on which channel estimation and decoding have been performed, and a discovery area identifier corresponding to a demodulation reference symbol sequence that succeeds in the check is the discovery area identifier of the second user equipment.

Figure 8:
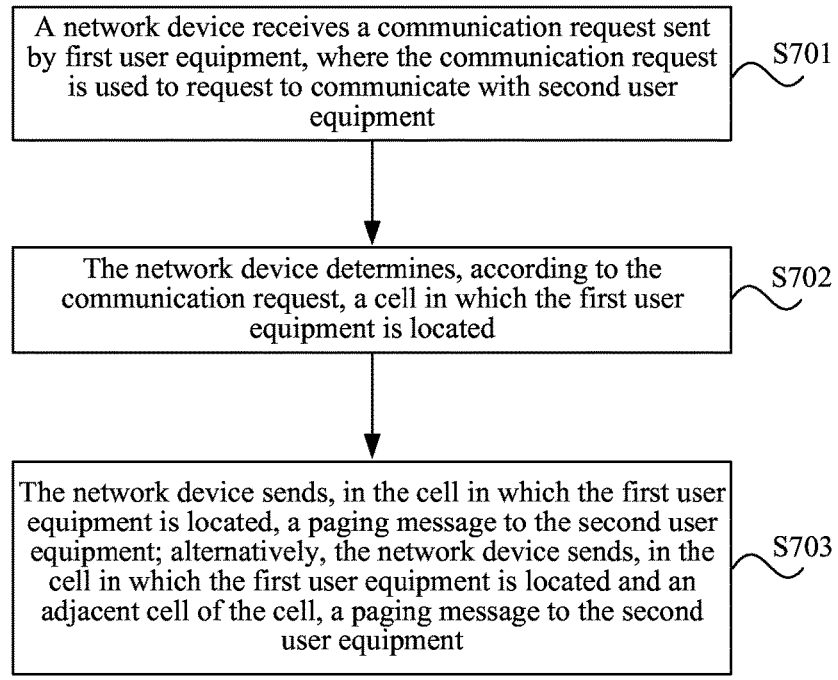
FIG. 8 is a flowchart of an embodiment of a paging method.

FIG. 8 is a flowchart of an embodiment of a paging method according to the present invention. As shown in FIG. 7, the method includes the following steps.

S701: A network device receives a communication request sent by first user equipment, where the communication request is used to request to communicate with second user equipment.

S702: The network device determines, according to the communication request, a cell in which the first user equipment is located.

S703: The network device sends, in the cell in which the first user equipment is located, a paging message to the second user equipment; alternatively, the network device sends, in the cell in which the first user equipment is located and an adjacent cell of the cell, a paging message to the second user equipment.

Figure 9:
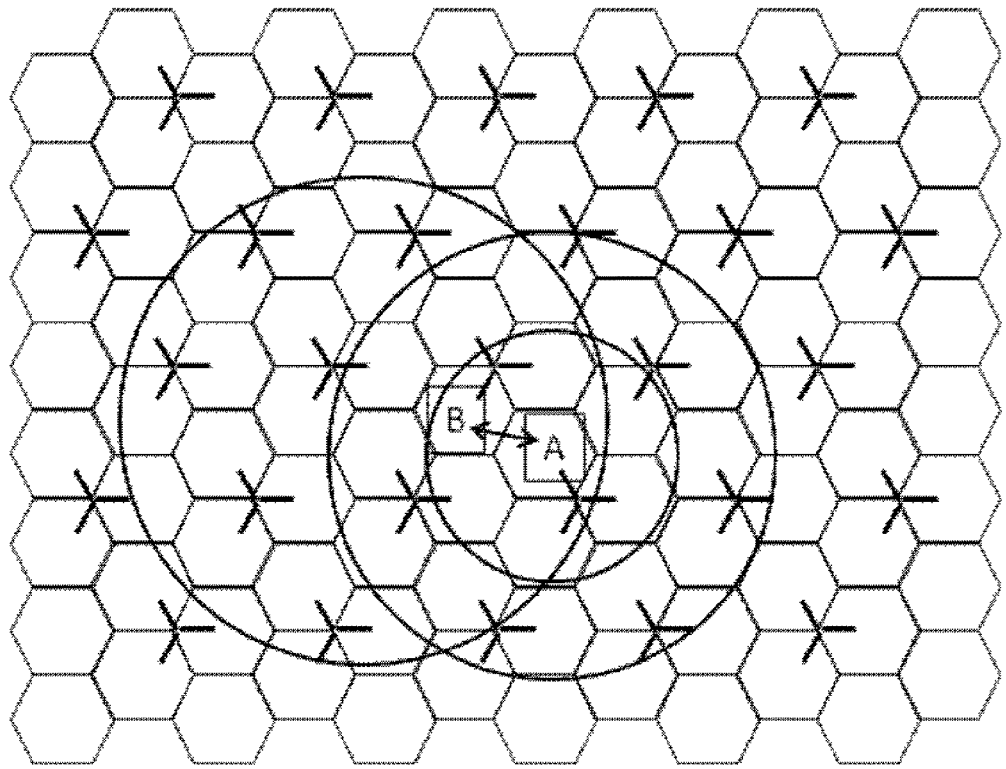
FIG. 9 is a schematic diagram of a paging range of a paging method.

As shown in FIG. 9, it is assumed that user equipment A initiates a direct communication request to user equipment B. When the network device needs to send a paging signal to the user equipment B, the network device may send, in a cell in which the user equipment A is located or an adjacent cell of a cell in which the user equipment A is located, the paging signal to the user equipment B. Adjacent cells of the cell in which the user equipment A is located may include neighboring cells of the cell in which the user equipment A is located, and respective neighboring cells of these neighboring cells, that is, cells included in a second circular ring around the periphery of the user equipment A in FIG. 9.

The network device may also send, in the cell in which the first user equipment is located and an intersection area of the adjacent cell of the first cell and a tracking area of the second user equipment, the paging message to the second user equipment, that is, an intersection of cells included in the second circular ring around the periphery of the user equipment A and cells included in a circular ring around the periphery of the user equipment B shown in FIG. 9.

According to a cyclic method provided by this embodiment, a network device sends, in a cell in which first user equipment is located, a paging message to second user equipment, or sends, in a cell in which first user equipment is located and an adjacent cell of the cell, a paging message to second user equipment, which narrows down a range within which the network device initiates the paging message to the second user equipment, and saves resources used in a D2D paging process.

Figure 10:
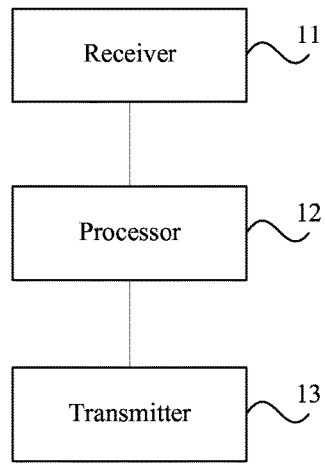
FIG. 10 is a schematic structural diagram of an embodiment of user equipment.

FIG. 10 is a schematic structural diagram of an embodiment of user equipment according to the present invention. As shown in FIG. 10, the user equipment includes a receiver 11, configured to receive a discovery message sent by second user equipment, where the discovery message indicates cell information of the second user equipment. A processor 12, configured to acquire the cell information of the second user equipment; and a transmitter 13, configured to send a communication request to a network device according to the discovery message, where the communication request is used to request to communicate with the second user equipment, and the communication request indicates the cell information of the second user equipment, so that the network device sends a paging message to the second user equipment according to the communication request and a cell message of the second user equipment.

Optionally, the cell information of the second user equipment includes an identifier of a cell in which the second user equipment is located; that the discovery message indicates cell information of the second user equipment includes: the discovery message carries the identifier of the cell in which the second user equipment is located; and the processor 12 is specifically configured to read the identifier, which is carried in the discovery message, of the cell in which the second user equipment is located.

Optionally, the cell information of the second user equipment includes a discovery area identifier of the second user equipment; that the discovery message indicates cell information of the second user equipment includes: the discovery message carries the discovery area identifier of the second user equipment; and the processor 12 is specifically configured to read the discovery area identifier of the second user equipment that is carried in the discovery message.

Optionally, the cell information of the second user equipment includes a discovery area identifier of the second user equipment; that the discovery message indicates cell information of the second user equipment includes: the discovery message indicates the discovery area identifier of the second user equipment by using a codeword resource used by the discovery message; and the processor is specifically configured to determine the discovery area identifier of the second user equipment according to a correspondence between a discovery area identifier and a codeword resource, and the codeword resource used by the discovery message.

Optionally, the codeword resource includes a scrambling codeword, and the correspondence between a discovery area identifier and a codeword resource includes a correspondence between a discovery area identifier and a scrambling codeword; and the processor 12 is further configured to descramble the discovery message by using at least one scrambling codeword, and determine that a scrambling codeword that is used to perform the descrambling successfully is a scrambling codeword used by the discovery message.

Optionally, the codeword resource includes a demodulation reference symbol sequence, and the correspondence between a discovery area identifier and a codeword resource includes a correspondence between a discovery area identifier and a demodulation reference symbol sequence; and the processor 12 is further configured to perform channel estimation and decoding on the discovery message by using at least one demodulation reference symbol sequence, and determine that a demodulation reference symbol sequence that is used to perform the channel estimation and decoding successfully is a demodulation reference symbol sequence used by the discovery message.

Optionally, the cell information of the second user equipment includes a discovery area identifier of the second user equipment; that the discovery message indicates cell information of the second user equipment includes: the discovery message indicates the discovery area identifier of the second user equipment by using a frequency resource used by the discovery message; and the processor 12 is specifically configured to determine the discovery area identifier of the second user equipment according to a correspondence between a discovery area identifier and a frequency resource, and the frequency resource used by the discovery message.

Optionally, the cell information of the second user equipment includes a discovery area identifier of the second user equipment; that the discovery message indicates cell information of the second user equipment includes: the discovery message indicates the discovery area identifier of the second user equipment by using a time resource used by the discovery message; and the processor 12 is specifically configured to determine the discovery area identifier of the second user equipment according to a correspondence between a discovery area identifier and a time resource, and the time resource used by the discovery message.

The user equipment provided by this embodiment corresponds to the communication methods shown in FIG. 1, FIG. 3, FIG. 7, and FIG. 8, and for details, reference may be made to the related descriptions in the foregoing embodiments.

The user equipment provided by this embodiment is first user equipment, and the first user equipment receives a discovery message that is sent by second user equipment and indicates cell information of the user equipment, so that the first user equipment that receives the discovery message sends a communication request to a network device according to the discovery message, where the communication request indicates the cell information of the second user equipment, so that the network device sends a paging message to the second user equipment according to a cell message of the second user equipment, which narrows down a range within which the network device initiates the paging message to the second user equipment, and saves resources used in a paging process of direct communication.

Figure 11:
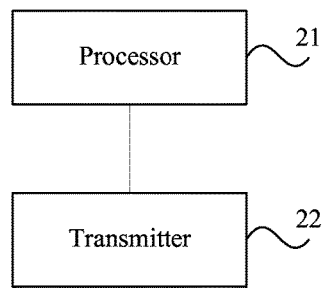
FIG. 11 is a schematic structural diagram of another embodiment of user equipment.

FIG. 11 is a schematic structural diagram of another embodiment of user equipment. As shown in FIG. 11, the user equipment is second user equipment and includes a processor 21, configured to generate a discovery message; and a transmitter 22, configured to send a discovery message, where the discovery message indicates cell information of the second user equipment, so that first user equipment that receives the discovery message sends a communication request to a network device according to the discovery message, where the communication request is used to request to communicate with the second user equipment, and the communication request indicates the cell information of the second user equipment, so that the network device sends a paging message to the second user equipment according to the communication request and a cell message of the second user equipment.

Optionally, the cell information of the second user equipment includes an identifier of a cell in which the second user equipment is located; and that the discovery message indicates cell information of the second user equipment includes: the discovery message carries the identifier of the cell in which the second user equipment is located.

Optionally, the cell information of the second user equipment includes a discovery area identifier of the second user equipment; and that the discovery message indicates cell information of the second user equipment includes: the discovery message carries the discovery area identifier of the second user equipment.

Optionally, the cell information of the second user equipment includes a discovery area identifier of the second user equipment; the processor 21 is further configured to determine, according to a correspondence between a discovery area identifier and a codeword resource, and the discovery area identifier of the second user equipment, a codeword resource corresponding to the discovery area identifier of the second user equipment; the transmitter 22 is specifically configured to send the discovery message by using the codeword resource corresponding to the discovery area identifier of the second user equipment; and that the discovery message indicates cell information of the second user equipment includes: the discovery message indicates the discovery area identifier of the second user equipment by using the codeword resource used by the discovery message.

Figure 12:
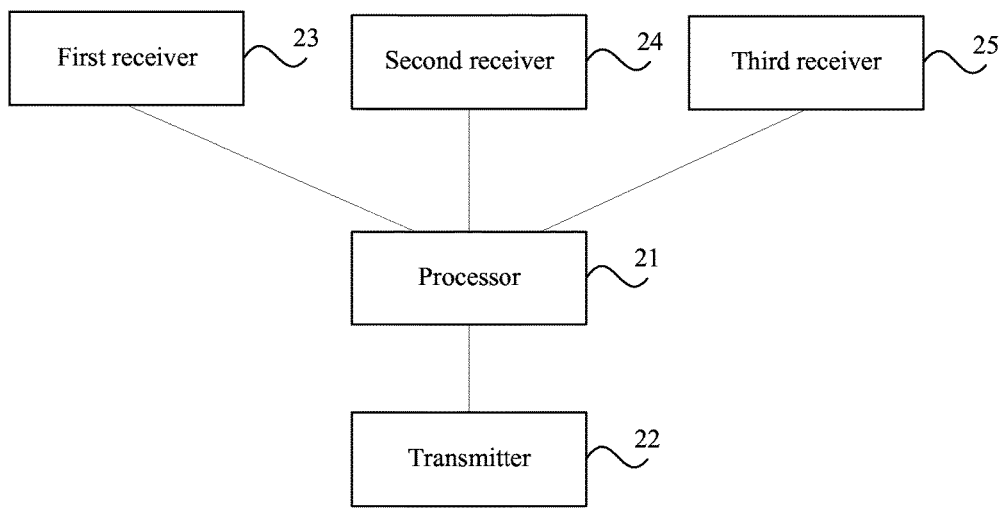
FIG. 12 is a schematic structural diagram of still another embodiment of user equipment.

As shown in FIG. 12, optionally, the cell information of the second user equipment includes a discovery area identifier of the second user equipment; the user equipment further includes: a first receiver 23, configured to acquire a codeword resource used by a current cell; the transmitter 22 is specifically configured to send the discovery message by using the codeword resource used by the current cell; and that the discovery message indicates cell information of the second user equipment includes: the discovery message indicates the discovery area identifier of the second user equipment by using the codeword resource used by the discovery message.

Optionally, the codeword resource includes a scrambling codeword, and the correspondence between a discovery area identifier and a codeword resource includes a correspondence between a discovery area identifier and a scrambling codeword.

Optionally, the codeword resource includes a demodulation reference symbol sequence, and the correspondence between a discovery area identifier and a codeword resource includes a correspondence between a discovery area identifier and a demodulation reference symbol sequence.

Optionally, the cell information of the second user equipment includes a discovery area identifier of the second user equipment; the transmitter 22 is specifically configured to: determine, according to a correspondence between a discovery area identifier and a frequency resource, and the discovery area identifier of the second user equipment, a frequency resource corresponding to the discovery area identifier of the second user equipment; and send, by the second user equipment, the discovery message by using the frequency resource corresponding to the discovery area identifier of the second user equipment; and that the discovery message indicates cell information of the second user equipment includes: the discovery message indicates the discovery area identifier of the second user equipment by using the frequency resource used by the discovery message.

Optionally, the cell information of the second user equipment includes a discovery area identifier of the second user equipment; the user equipment further includes: a second receiver 24, configured to acquire a frequency resource used by a current cell; the transmitter 22 is specifically configured to send the discovery message by using the frequency resource used by the current cell; and that the discovery message indicates cell information of the second user equipment includes: the discovery message indicates the discovery area identifier of the second user equipment by using the frequency resource used by the discovery message.

Optionally, the cell information of the second user equipment includes a discovery area identifier of the second user equipment; the transmitter 22 is specifically configured to: determine, according to a correspondence between a discovery area identifier and a time resource, and the discovery area identifier of the second user equipment, a time resource corresponding to the discovery area identifier of the second user equipment; and send, by the second user equipment, the discovery message by using the time resource corresponding to the discovery area identifier of the second user equipment; and that the discovery message indicates cell information of the second user equipment includes: the discovery message indicates the discovery area identifier of the second user equipment by using the time resource used by the discovery message.

Optionally, the cell information of the second user equipment includes a discovery area identifier of the second user equipment; the user equipment further includes: a third receiver 25, configured to acquire a time resource used by a current cell; the transmitter 22 is specifically configured to send the discovery message by using the time resource used by the current cell; and that the discovery message indicates cell information of the second user equipment includes: the discovery message indicates the discovery area identifier of the second user equipment by using the time resource used by the discovery message.

The user equipment provided by this embodiment corresponds to the communication methods shown in FIG. 1, FIG. 2, FIG. 6, and FIG. 7, and for details, reference may be made to the related descriptions in the foregoing embodiments.

The user equipment provided by this embodiment is second user equipment, and a discovery message sent by the second user equipment indicates cell information of the user equipment, so that first user equipment that receives the discovery message sends a communication request to a network device according to the discovery message, where the communication request indicates the cell information of the second user equipment, so that the network device sends a paging message to the second user equipment according to a cell message of the second user equipment, which narrows down a range within which the network device initiates the paging message to the second user equipment, and saves resources used in a paging process of direct communication.

Figure 13:
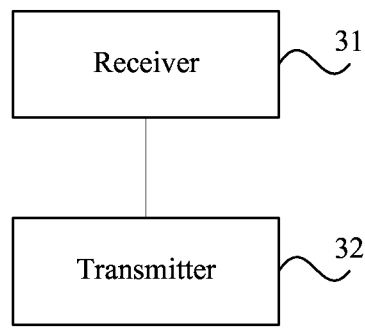
FIG. 13 is a schematic structural diagram of an embodiment of a network device.

FIG. 13 is a schematic structural diagram of an embodiment of a network device. As shown in FIG. 13, the network device includes a receiver 31, configured to receive a communication request sent by first user equipment, where the communication request is used by the first user equipment to request to communicate with second user equipment, and the communication request indicates cell information of the second user equipment; and a transmitter 32, configured to send a paging message to the second user equipment according to the communication request and the cell information of the second user equipment.

Optionally, the cell information of the second user equipment includes an identifier of a cell in which the second user equipment is located, or a discovery area identifier of the second user equipment; and the transmitter 32 is specifically configured to: send, in the cell in which the second user equipment is located, the paging message to the second device according to the identifier of the cell in which the second user equipment is located; or send, in a discovery area of the second user equipment, the paging message to the second user equipment according to the discovery area identifier of the second user equipment.

Optionally, the sending, by the transmitter 32 in a discovery area of the second user equipment, the paging message to the second user equipment is specifically: sending, in an intersection area of the discovery area of the second user equipment and a tracking area of the second user equipment, the paging message to the second user equipment.

Optionally, the transmitter 32 is further configured to send a correspondence between a cell and a discovery area identifier to the second user equipment, so that the second user equipment determines the discovery area identifier of the second user equipment according to the correspondence between a cell and a discovery area identifier, and the cell in which the second user equipment is located.

Optionally, the transmitter 32 is further configured to send a correspondence between a discovery area identifier and a physical resource to the second user equipment, where the physical resource includes a codeword resource, a frequency resource, or a time resource.

Optionally, the transmitter 32 is further configured to send a physical resource used by a current cell of the second user equipment to the second user equipment, where the physical resource includes a codeword resource, a frequency resource, or a time resource.

Optionally, the codeword resource includes a scrambling codeword, a demodulation reference symbol sequence, or a bearer signal sequence.

The network device provided by this embodiment corresponds to the communication methods shown in FIG. 4, FIG. 5*a*, and FIG. 5*b*, and for details, reference may be made to the related descriptions in the foregoing embodiments.

According to the network provided by this embodiment, a discovery message sent by second user equipment indicates cell information of the user equipment, so that first user equipment that receives the discovery message sends a communication request to a network device according to the discovery message, where the communication request indicates the cell information of the second user equipment, so that the network device sends a paging message to the second user equipment according to a cell message of the second user equipment, which narrows down a range within which the network device initiates the paging message to the second user equipment, and saves resources used in a paging process of direct communication.

Figure 14:
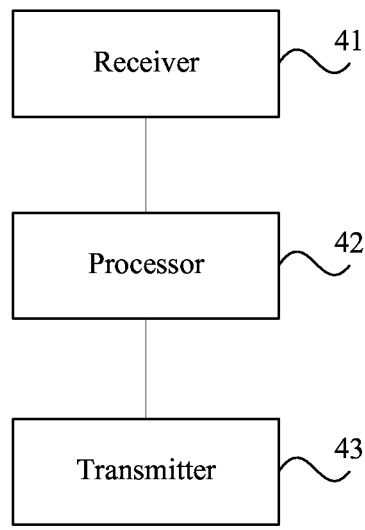
FIG. 14 is a schematic structural diagram of an embodiment of a network device.

FIG. 14 is a schematic structural diagram of an embodiment of a network device according to the present invention. As shown in FIG. 14, the network device includes: a receiver 41, configured to receive a communication request sent by first user equipment, where the communication request is used to request to communicate with second user equipment; a processor 42, configured to determine, according to the communication request, a cell in which the first user equipment is located; and a transmitter 43, configured to: send, in the cell in which the first user equipment is located, a paging message to the second user equipment; or send, in the cell in which the first user equipment is located and an adjacent cell of the cell, a paging message to the second user equipment.

Optionally, the sending, by a transmitter 43 in the cell in which the first user equipment is located and an adjacent cell of the cell, a paging message to the second user equipment is specifically: sending, in the cell in which the first user equipment is located and an intersection area of the adjacent cell of the first cell and a tracking area of the second user equipment, the paging message to the second user equipment.

The network device provided by this embodiment corresponds to the communication methods shown in FIG. 8 to FIG. 10, and for details, reference may be made to the related descriptions in the foregoing embodiments.

According to the network device provided by this embodiment, the network device sends, in a cell in which first user equipment is located, a paging message to second user equipment, or sends, in a cell in which first user equipment is located and an adjacent cell of the cell, a paging message to second user equipment, which narrows down a range within which the network device initiates the paging message to the second user equipment, and saves resources used in a D2D paging process.

It may be clearly understood by persons skilled in the art that, for the purpose of convenient and brief description, division of the foregoing functional modules is merely used as an example for description. In an actual application, the foregoing functions may be allocated to different functional modules and implemented according to a requirement, that is, the internal structure of the apparatus is divided into different functional modules to complete all or some of the functions described above. For a detailed working process of the foregoing system, apparatus, and unit, reference may be made to a corresponding process in the foregoing method embodiments, and details are not provided herein again.

In the several embodiments provided by this application, it should be understood that the disclosed system, apparatus, and method may be implemented in other manners. For example, the described apparatus embodiment is merely exemplary. For example, the module or unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, rather than limiting this application. Although this application is described in detail with reference to the foregoing embodiments, persons of ordinary skill in the art should understand that they may still make modifications to the technical solutions described in the foregoing embodiments or make equivalent replacements to some technical features thereof, as long as such modifications or replacements do not cause the essence of corresponding technical solutions to depart from the spirit and scope of the technical solutions of the embodiments of this application.

What is claimed is:

1. A first user equipment, comprising:
a receiver, configured to receive a discovery message sent by a second user equipment using a codeword resource, wherein the the codeword resource corresponds to a discovery area identifier of the second user equipment, and wherein the discovery area identifier is an identifier of an area in which the second user equipment is located, and the discovery area identifier has a length that is shorter than a length of a cell identifier of a cell in which the second user equipment is located;
a processor coupled to the receiver and configured to acquire the discovery area identifier of the second user equipment using the correspondence between the codeword resource and the discovery area identifier; and
a transmitter coupled to the processor and configured to send a communication request to a network device according to the discovery message, wherein the communication request is used to request to communicate with the second user equipment, and the communication request indicates the discovery area identifier of the second user equipment, wherein the network device sends a paging message to the second user equipment according to the communication request and the discovery area identifier of the second user equipment.

2. The first user equipment according to claim 1, wherein:
the discovery area identifier of the second user equipment corresponds to a single discovery area in the area in which the second user equipment is located.

3. The first user equipment according to claim 1, wherein:
the codeword resource comprises a scrambling codeword, and the correspondence between a discovery area identifier and the codeword resource comprises a correspondence between the discovery area identifier and the scrambling codeword; and
the processor is further configured to descramble the discovery message using the scrambling codeword, and determine that the scrambling codeword that is used to perform the descrambling successfully is the scrambling codeword used by the discovery message.

4. The first user equipment according to claim 1, wherein:
the codeword resource comprises a demodulation reference symbol sequence, and the correspondence between the discovery area identifier and the codeword resource comprises a correspondence between the discovery area identifier and the demodulation reference symbol sequence; and
the processor is further configured to perform channel estimation and decoding on the discovery message by using the demodulation reference symbol sequence, and determine that the demodulation reference symbol sequence that is used to perform the channel estimation and decoding successfully is the demodulation reference symbol sequence used by the discovery message.

5. The first user equipment according to claim 1, wherein the discovery area identifier is a sequence number of a sequence of cells located in the area in which the second user equipment is located.

6. A second user equipment, comprising:
a processor, configured to:
determine, according to a correspondence between a discovery area identifier of the second user equipment and a codeword resource, the codeword resource corresponding to the discovery area identifier of the second user equipment, wherein the discovery area identifier is an identifier of an area in which the second user equipment is located, and the discovery area identifier has a length that is shorter than a length of a cell identifier of a cell in which the second user equipment is located; and
generate a discovery message; and
a transmitter coupled to the processor and configured to send the discovery message using the codeword resource corresponding to the discovery area identifier of the second user equipment, the codeword resource indicating the discovery area identifier of the second user equipment, so that a first user equipment that receives the discovery message, determines the discovery area identifier of the second user equipment according to the correspondence, and sends a communication request to a network device according to the discovery message, wherein the communication request is used to request to communicate with the second user equipment, and the communication request indicates the discovery area identifier of the second user equipment, so that the network device sends a paging message to the second user equipment according to the communication request and the discovery area identifier of the second user equipment.

7. The second user equipment according to claim 6, wherein the codeword resource comprises a scrambling codeword, and the correspondence between the discovery area identifier and the codeword resource comprises a correspondence between the discovery area identifier and the scrambling codeword.

8. The second user equipment according to claim 6, wherein the codeword resource comprises a demodulation reference symbol sequence, and the correspondence between the discovery area identifier and the codeword resource comprises a correspondence between the discovery area identifier and the demodulation reference symbol sequence.

9. The second user equipment according to claim 6, wherein the correspondence between the discovery area identifier of the second user equipment and the codeword resource comprises a mapping relationship in a form of a list.

10. The second user equipment according to claim 6, wherein the correspondence between the discovery area identifier of the second user equipment and the codeword resource comprises a mapping table.

11. The second user equipment according to claim 6, wherein the correspondence between the discovery area identifier of the second user equipment and the codeword resource is calculated using a set formula.

12. The second user equipment according to claim 6, wherein the correspondence between the discovery area identifier of the second user equipment and the codeword resource is delivered to the second user equipment by the network device.

13. The second user equipment according to claim 6, wherein the correspondence between the discovery area identifier of the second user equipment and the codeword resource is pre-stored in the second user equipment.

14. A second user equipment, comprising:
a processor, configured to:
determine, according to a correspondence between a discovery area identifier and a resource, the resource corresponding to the discovery area identifier of the second user equipment, wherein the resource is a time resource or a frequency resource, wherein the discovery area identifier is an identifier of an area in which the second user equipment is located, and the discovery area identifier has a length that is shorter than a length of a cell identifier of a cell in which the second user equipment is located; and generate a discovery message; and a transmitter, coupled to the processor and configured to send the discovery message using the resource corresponding to the discovery area identifier of the second user equipment, the resource indicating the discovery area identifier of the second user equipment, wherein a first user equipment that receives the discovery message sends a communication request to a network device according to the resource used for the sending of the discovery message, wherein the communication request is used to request to communicate with the second user equipment, and the communication request indicates the discovery area identifier of the second user equipment, so that the network device sends a paging message to the second user equipment according to the communication request and the discovery area identifier of the second user equipment.

15. The second user equipment according to claim 14, wherein:

the resource is a frequency resource used by a current cell.

16. The second user equipment according to claim 14, wherein:

the resource is a time resource used by a current cell.

* * * * *